United States Patent [19]

Kampmann

[11] Patent Number: 4,548,517

[45] Date of Patent: Oct. 22, 1985

[54] DEVICE FOR MEASURING THE TEMPERATURE IN A DUST CARRYING GAS STREAM

[75] Inventor: Harry Kampmann, Lünen, Fed. Rep. of Germany

[73] Assignee: Steag AG, Essen, Fed. Rep. of Germany

[21] Appl. No.: 571,525

[22] Filed: Jan. 17, 1984

[30] Foreign Application Priority Data

Jan. 21, 1983 [DE] Fed. Rep. of Germany ....... 3301886

[51] Int. Cl.[4] .................. G01K 1/08; G01K 13/02
[52] U.S. Cl. ..................... 374/143; 73/714; 374/138; 374/208; 374/7
[58] Field of Search ............ 374/143, 142, 7, 138; 73/86, 714

[56] References Cited

U.S. PATENT DOCUMENTS

| | | | |
|---|---|---|---|
| 3,165,924 | 1/1965 | Wolff | 73/86 X |
| 3,342,064 | 9/1967 | Blattner | 73/86 |
| 3,512,413 | 5/1970 | Krusenstierna et al. | 374/7 X |
| 4,064,756 | 12/1977 | MacLean et al. | 73/7 X |
| 4,358,953 | 11/1982 | Horiuchi et al. | 374/7 |
| 4,412,090 | 10/1983 | Kawafe et al. | 73/86 X |

FOREIGN PATENT DOCUMENTS

0658414 12/1977 U.S.S.R. .................. 374/138
0920474 4/1982 U.S.S.R. .................. 73/86

Primary Examiner—Daniel M. Yasich
Attorney, Agent, or Firm—Young & Thompson

[57] ABSTRACT

In a device for measuring the temperature in a dust carrying gas stream having a temperature probe and a deflecting rod enclosing the probe at least partially and structure mounting the temperature probe and the deflecting rod within the gas stream substantially transversely to the flow direction an arrangement is provided to increase the operational safety. This is achieved on the one hand in that the deflecting rod is provided on its side facing away from the flow direction with a recess open towards the surface of the deflecting rod and that the temperature probe is arranged in the recess without contact with the wall of the recess and/or in that on the other hand within the deflecting rod substantially in parallel to the temperature probe and in spaced relation thereto at least one longitudinally extending channel filled with a fluid under pressure is provided, which is arranged seen at least in the flow direction of the gas stream a predetermined distance in front of the temperature probe and that the channel is connected to a pressure sensor.

5 Claims, 3 Drawing Figures

U.S. Patent  Oct. 22, 1985  Sheet 1 of 2  4,548,517
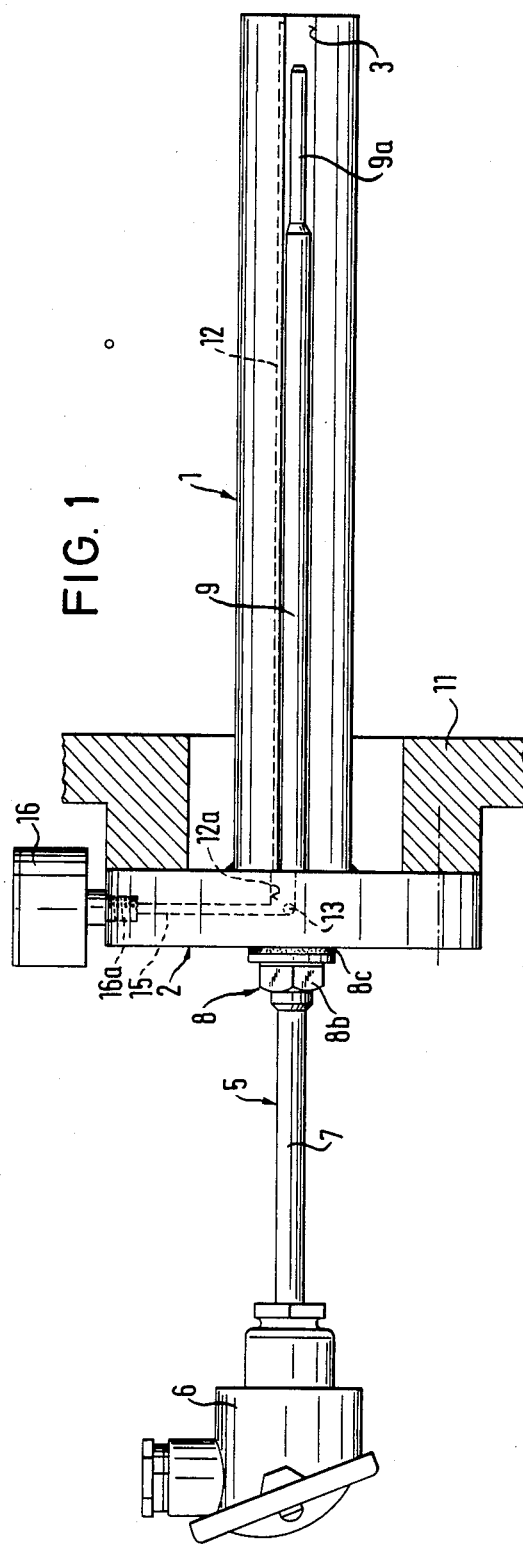
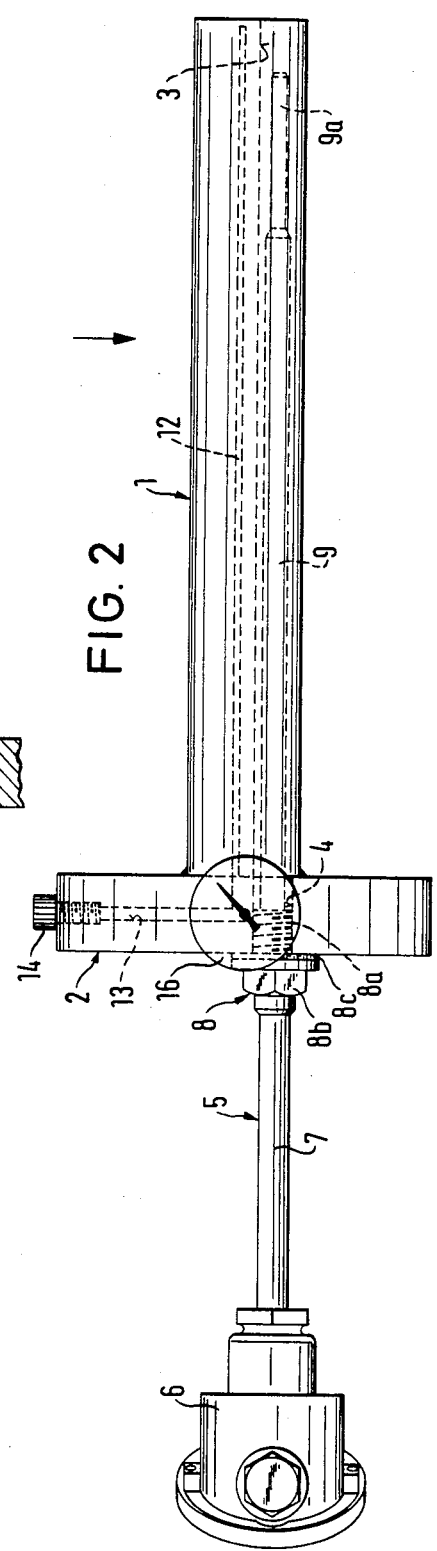

DEVICE FOR MEASURING THE TEMPERATURE IN A DUST CARRYING GAS STREAM

BACKGROUND OF THE INVENTION

The invention concerns a device for measuring the temperature in a dust carrying gas stream having a temperature probe and a deflecting rod enclosing the probe at least partially and means for mounting the temperature probe and the deflecting rod within the gas stream substantially transversely to the flow direction.

Such devices are used for example for the measuring of the sifter temperature at coal crushers in coal fired power plants. With a known device of this type a bore is provided in the deflecting rod, in which bore the temperature probe is arranged. Due to this centered embedding of the temperature probe temperature variations in the coal dust carrying gas stream are detected only delayed in time. Since the output signal of the temperature probe is fed to the hot or cool air flap control of the coal crusher as a command variable, it is possible that there can be improper operation due to the delayed detection of the temperature variation and a corresponding slow response of the control. Further in case of the known arrangement it has to be provided that the temperature probe has a sufficient heat transfer contact with the inner wall of the bore. Due to the mechanical contact the oscillations impressed by the gas flow on the deflecting rod clamped at one end are transferred to the temperature probe, so that the life time thereof is decreased. Finally, the known device has the disadvantage that the wear of the deflecting rod cannot be detected during operation of the device and in that the state of wear can only be checked by the removal of the device from the measuring position.

First of all, it is the object of the present invention to provide a measuring device of the kind described above, with which a quick measurement and therewith an undelayed determination of a command variable is possible and with which simultaneously a substantially oscillation-free mounting of the temperature probe is possible.

SUMMARY OF THE INVENTION

According to the invention, there is provided a device for measuring the temperature in a dust carrying gas stream having a temperature probe and a deflecting rod enclosing the probe at least partially and means for mounting the temperature probe and the deflecting rod within the gas stream substantially transversely to the flow direction, wherein the deflecting rod is provided on its side facing away from the flow direction with a recess open towards the surface of the deflecting rod and the temperature probe is arranged in the recess without contact with the wall of the recess.

Surprisingly it has proven that an all-around embedding of the temperature probe within the deflecting rod is not necessary to protect the temperature probe. The recess open towards the surface of the deflecting rod provides that the temperature probe can sense temperature variations in the gas stream flowing against the deflecting rod without delay in time. The mounting of the temperature probe is provided without contact with the wall of the recess, so that the oscillations of the deflection rod which is mounted in cantilever fashion may not be transferred on the temperature probe.

It is a further object of the invention to provide for wear detection in a device for measuring the temperature in a dust carrying gas stream having a temperature probe and a deflecting rod enclosing the sensor at least partially and means for mounting the temperature sensor and the deflecting rod within the gas stream substantially transversely to the flow direction.

According to the invention there is provided a device for measuring the temperature in a dust carrying gas stream having a temperature probe and deflecting rod enclosing the sensor at least partially and means for mounting the temperature sensor and the deflecting rod within the gas stream substantially transversely to the flow direction, wherein within the deflecting rod substantially in parallel to the temperature probe and in spaced relation thereto at least one longitudinally extending channel filled with a fluid under pressure is provided, which is arranged seen at least in the flow direction of the gas stream a predetermined distance in front of the temperature probe and wherein the channel is connected to a pressure sensor.

If the wear of the deflecting rod due to the dust in the gas stream has proceeded so far that the channel is reached, a pressure decrease takes place in the channel, which decrease is sensed by the pressure sensor.

The pressure sensor may be e.g. a manometer arranged in a measuring position; further it is possible to provide at the measuring position an electrical pressure switch, so that an electrical signal can be transmitted from the measuring location for example to the control room of a power plant, in which control room the pressure decrease can be signalled by optical and/or accoustical alarm means or by an off-normal printer. The position of the wear detection channel with respect to the temperature probe especially with respect to the recess in case of the design of the deflecting rod in the above described inventive manner, can be selected in such a manner that in case of the deflecting rod wearing down to the channel so much material of the deflecting rod is at hand that the device remains still in operational order for a certain time. It is further preferred to use water as a fluid for the filling of the wear detection channel, which is filled with a certain prepressure, so that a certain operational pressure will be at hand under operational temperature, for example 2.5 bar. Further, it is preferred to add a sealing additive to the fluid, for example radiator guard additives known in the automotive technology, since then the escape of fluid through eventually forming hairline cracks is avoided and a pressure decrease in the wear detection channel occurs only in case the channel wall itself is reached.

Further it is possible to provide a plurality of wear detection channels in the deflecting rod, so that for example during the operation information can be obtained as to the amount of wear, if those channels are reached successively by the wear front.

The provision of the recess on the side of the deflecting rod facing away from the stream provides that on the one hand the greater part of the deflecting rod cross-section adds to the wear protection (in case of the known centered arrangement of the temperature probe only half the cross-section of the deflecting rod adds to the wear protection) and on the other hand the wear detection channel can be arranged with a sufficient safety distance from the temperature probe.

The present invention also includes, however, such a device in which the temperature probe is arranged in a centered bore with a closed envelope and in which within the remaining cross section a wear detection channel according to the invention is provided.

BRIEF DESCRIPTION OF THE DRAWINGS

FIG. 1 is a side view of the device according to the invention in a position, in which the flow direction of the gas intersects the plane of the drawing perpendicularily from below, FIG. 2 is a plan view of the device according to the invention, wherein the flow is directed in the plane of drawing of FIG. 2 from above to below.

DETAILED DESCRIPTION OF THE PREFERRED EMBODIMENTS

Figure 3:
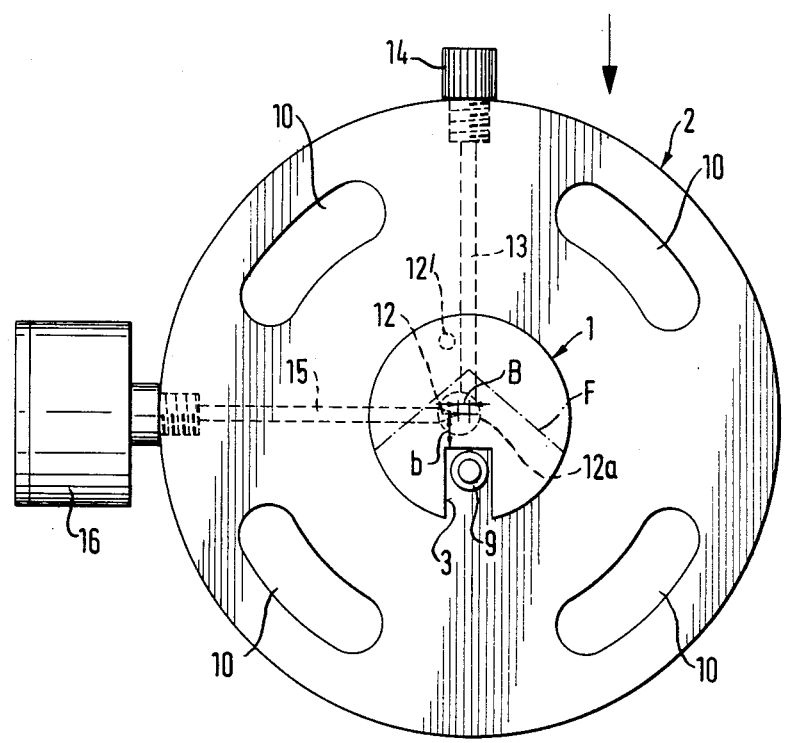
FIG. 3 is an end view of the device from the free end of the deflecting rod.

The deflecting rod 1 of wear resistant material is welded at one end thereof to a flange 2. In parallel to the axis of the deflecting rod 1 a recess 3 is provided, which opens towards the surface of the deflecting rod. In flange 2 a bore 4 with an internal thread is provided in alignment with the recess 3. A temperature probe 5 is threaded into bore 4.

The temperature probe 5 consists of a connecting section 6, a neck tube section 7, a mounting section 8 and a measuring section 9. The mounting section 8 is provided with an outer thread 8a corresponding to the internal thread of the bore 4 and is provided with an hexagonal head 8b, which allows a threading into the flange 2. Between the contact surface of the hexagonal head 8b and the contact surface of the flange 2 a sealing ring 8c is positioned.

The tip of the measuring section 9 is a quickly responding tip 9a of reduced diameter. In the quickly responding tim 9a a thermocouple element, for example a NiCr-Ni-element is arranged, the supply wires of which are led through the measuring section 9, the mounting section 8, the neck tube section 7 to the connecting section 6. Since the electrical design of the temperature probe is not the subject of the present invention it is unnecessary to describe the details thereof. The position of bore 4 with respect to the recess 3 and the mounting section 8 are such that the measuring section 9 does not contact the wall of the recess 3. The flange 2 is provided with a plurality of mounting holes 10 evenly distributed around the periphery thereof, through which threaded bolts (not shown) for the mounting of the measuring device to a wall 11 schematically shown in FIG. 1 and delimiting the gas flow, extend in such a manner that deflecting rod and measuring section can be aligned with the direction of the gas flow.

In FIGS. 1-3 the flow directions are represented by the arrows. In FIG. 3 it is indicated in dashed lines that due to the wear the circular primary cross-section there changes to a wedge-type cross-section. To detect the wear within the deflecting rod a wear detection channel 12 is provided ending near the free end of the deflecting rod, which channel extends in parallel to the measuring section 9 of the temperature probe 5 and thus in parallel to the recess 3. Due to the wedge shape of the wear cross section the channel 12 is displaced by the amount B with respect to the center plane extending through the measuring probe 5 and by a predetermined distance b from the bottom of the recess 3. (FIG. 3).

The channel 12 in the deflecting rod 1 opens into a connection pocket bore 12a in flange 2, into which a radial channel 13 provided in the flange also opens. The radial channel 13 is closed by a screw plug 14.

A radial channel 15 extending in a radius other than the radial channel 13 is also connected to the connecting pocket bore 12a, which radial channel 15 is closed at its end by a manometer 16 with a threaded connection 16a. After screwing in of the manometer 16 the channel system 12, 13 and 14 is filled with water, to which if desired a radiator additive is added and thereafter the screw plug 14 is screwed in, until the predetermined pressure is adjusted, which pressure can be read on the manometer 16. The screw plug 14 is secured in its position by proper securing means (for example bonded). The manometer 16 is designed for the pressure encountered in the channel system at operational temperature. When the wear front F reaches the channel 12, the channel system is emptied. This can be read as a pressure decrease on the manometer. Instead of the manometer 16 or in addition to the manometer an electrical pressure switch can be provided, so that the pressure decrease in the channel system can be transmitted to the control room.

It is also possible that a further channel 12' (see FIG. 3) with a separate pressure indication can be arranged in front of channel 12, so that the progress of the wear in time can be detected. For most fields of application a channel 12 is, however, sufficient.

The dimensions B and b are preferably selected in such a manner that after the pressure decrease a predetermined operation time is still provided; the pressure decrease in the channel system is then detected and at the next opportunity, when the gas channel is not traversed by the gas flow to be monitored, the deflecting rod is changed.

With the device according to the invention the temperature probe can be unscrewed from the flange in a simple manner and thereby removed from the deflecting rod.

In case of wear of the deflecting rod it is possible to exchange the entire unit consisting of the deflecting rod 1 and the flange 2 after demounting of the manometer or a new deflecting rod 1 can simply be welded to the flange 2.

I claim:

1. In a device for measuring the temperature in a dust carrying gas stream having a temperature probe and a dust deflecting rod at least partially enclosing the probe in a recessed portion of the rod to shield the probe from the dust and means for mounting the temperature probe and the deflecting rod within the gas stream substantially transversely to the flow direction of the gas stream; the improvement in which within the deflecting rod at least one channel filled with fluid under pressure extends longitudinally of the rod and substantially parallel to the temperature probe and in spaced relation to the temperature probe, which channel is with respect to the flow direction of the gas stream a predetermined distance in front of the temperature probe and is connected to a pressure sensor to sense a drop of the pressure in the channel.

2. A device according to claim 1, wherein the recessed portion of the deflecting rod is a longitudinally extending recess, which opens toward the surface of the deflecting rod and faces downstream in the flow direction of the gas stream and in which the temperature probe is disposed out of contact with the wall of the recess.

3. A device according to claim 1, wherein said pressure sensor is a pressure gauge.

4. A device according to claim 1, wherein said fluid under pressure is water.

5. A device according to claim 1, and a sealing additive in said fluid.

* * * * *